United States Patent
Michels

(10) Patent No.: US 11,346,273 B2
(45) Date of Patent: May 31, 2022

(54) SUPPLY OF A FLUSHING FLUID TO AN ACTIVE PRECHAMBER OF A TURBOCHARGED GASOLINE ENGINE IN COMBINATION WITH TURBO COOLING

(71) Applicant: Volkswagen Aktiengesellschaft, Wolfsburg (DE)

(72) Inventor: Karsten Michels, Magdeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/076,763

(22) Filed: Oct. 21, 2020

(65) Prior Publication Data

US 2021/0115840 A1 Apr. 22, 2021

(30) Foreign Application Priority Data

Oct. 21, 2019 (DE) ...................... 10 2019 128 334.5

(51) Int. Cl.
*F02B 19/10* (2006.01)
*F02B 19/12* (2006.01)

(52) U.S. Cl.
CPC ............ *F02B 19/108* (2013.01); *F02B 19/12* (2013.01); *F02B 2710/00* (2013.01)

(58) Field of Classification Search
CPC ........ F02M 26/06; F02M 26/08; F02M 26/20; F02B 19/00; F02B 19/12; F02B 19/108; F02B 2710/00
See application file for complete search history.

(56) References Cited

U.S. PATENT DOCUMENTS

| | | | |
|---|---|---|---|
| 4,696,270 A | 9/1987 | Pischinger | |
| 4,756,285 A | 7/1988 | Pischinger | |
| 9,644,571 B2 * | 5/2017 | Gruber | F02M 21/0227 |
| 11,002,177 B2 * | 5/2021 | Singh | F02D 13/0276 |
| 2018/0363539 A1 * | 12/2018 | Shelby | F02B 19/108 |
| 2020/0158005 A1 | 5/2020 | Singh et al. | |
| 2020/0200068 A1 * | 6/2020 | Schock | F02B 21/02 |

(Continued)

FOREIGN PATENT DOCUMENTS

| | | |
|---|---|---|
| AT | 13 417 U1 | 12/2013 |
| DE | 35 06 217 A1 | 8/1986 |
| DE | 10 2016 112 537 A1 | 1/2018 |

(Continued)

*Primary Examiner* — Gonzalo Laguarda
(74) *Attorney, Agent, or Firm* — Muncy, Geissler, Olds & Lowe, P.C.

(57) ABSTRACT

A combustion engine having at least one cylinder, wherein the at least one cylinder has a main combustion chamber for burning a fuel/air mixture or a fuel/air/exhaust gas mixture and has a flushed prechamber connected to the main combustion chamber via at least one overflow duct on the fluid side, and comprises at least one exhaust gas turbocharger which has a turbine for the expansion of the at exhaust gas leaving the at least one cylinder and a compressor for compressing fresh air or a fresh air/exhaust gas mixture to be supplied to the at least one cylinder as compressed charge-air. For the supply of the combustion chamber, a combustion chamber charge-air line is disposed in a charge-air line downstream of the compressor and for the supply of the prechamber, a prechamber flushing line branching off at an extraction point is formed.

16 Claims, 3 Drawing Sheets

(56) References Cited

U.S. PATENT DOCUMENTS

2021/0115840 A1* 4/2021 Michels .............. F02B 19/1023

FOREIGN PATENT DOCUMENTS

| DE | 102016113307 B3 | 1/2018 |
| DE | 10 2015 202 193 B4 | 11/2019 |
| EP | 0192219 A2 | 8/1986 |
| EP | 0655550 A1 | 5/1995 |
| EP | 2 948 667 B1 | 7/2017 |

* cited by examiner

SUPPLY OF A FLUSHING FLUID TO AN ACTIVE PRECHAMBER OF A TURBOCHARGED GASOLINE ENGINE IN COMBINATION WITH TURBO COOLING

This nonprovisional application claims priority under 35 U.S.C. § 119(a) to German Patent Application No. 10 2019 128 334.5, which was filed in Germany on Oct. 21, 2019, and which is herein incorporated by reference.

BACKGROUND OF THE INVENTION

Field of the Invention

The present invention relates to an in ternal combustion engine, comprising at least one cylinder, wherein the at least one cylinder has a main combustion chamber for combustion of a fuel/air mixture or a fuel/air/exhaust gas mixture and a flushed prechamber connected to the main combustion chamber on the fluid side via at least one overflow duct and an exhaust gas turbocharger.

Description of the Background Art

The document EP 2 948 667 B1 describes a method for operating a multicylinder piston engine. It is provided that in the engine, each cylinder has a reciprocating piston and a pre-combustion chamber, and the method comprises the steps of introducing gaseous fuel in an intake duct of the engine, injecting liquid pilot fuel into the pre-combustion chamber, igniting the liquid pilot fuel by means of compression by the piston and utilizing the combustion of the liquid pilot fuel to ignite the gaseous fuel, wherein the exhaust gas is introduced in the pre-combustion chamber prior to the injection of the liquid pilot fuel. In this method, the exhaust gas is cooled before it is introduced in the pre-combustion chamber, and the intake air is mixed with the exhaust gas before the mixture of the exhaust gas and the intake air is introduced into the pre-combustion chamber.

Another gasoline engine and an associated method of the generic type for the supply of a main combustion chamber with compressed combustion air and a prechamber with a fuel/air mixture is known from the document DE 10 2016 112 537 A1. It is provided here that the gasoline engine comprises at least one cylinder, wherein the at least one cylinder includes a main combustion chamber for burning a fuel gas-air mixture and a flushed prechamber which is coupled to the main combustion chamber via an overflow passage. The gasoline engine further comprises at least one exhaust gas turbocharger which has a turbine for the expansion of the exhaust gas leaving the at least one cylinder and a compressor for compressing the air to be supplied to the at least one cylinder, wherein a plurality of air paths are provided for the at least one cylinder to be supplied with air, wherein via a first air path at least compressible air can be supplied by a first compressor to the main combustion chamber of the at least one cylinder and wherein via a second air path, compressible air can be supplied by a second compressor to the prechamber of at least each cylinder.

SUMMARY OF THE INVENTION

It is therefore an object of the present invention to provide a novel generic gasoline engine and a new method for the operation of the gasoline engine.

This object is achieved by an Otto-cycle internal combustion engine and a corresponding method of operation of the internal combustion engine.

The starting point of the invention is an internal combustion engine, comprising at least one cylinder, wherein the at least one cylinder has a main combustion chamber for combustion of a fuel/air mixture or a fuel/air/exhaust gas mixture and a flushed prechamber connected on the fluid side to the main combustion chamber via at least one overflow duct, and at least one exhaust gas turbocharger which has a turbine for the expansion of the exhaust gas leaving the at least one cylinder, and a compressor for compressing the fresh air or a fresh air/exhaust gas mixture to be supplied by the at least one cylinder as compressed charge-air.

According to the invention, it is provided that in a charge-air line downstream of the compressor, a combustion chamber charge-air line is formed for the supply of the combustion chamber, and a prechamber flushing line branching off from an extraction point is formed for the supply of the prechamber, wherein downstream of the compressor of the exhaust gas turbocharger upstream of the extraction point at least one intercooler is arranged for cooling the charge-air in the charge-air line.

A first intercooler and a further compressor of an air turbine-compressor unit as well as a further intercooler can be arranged upstream of the extraction point, wherein the air turbine is arranged downstream of the extraction point in the combustion chamber charge-air line.

A first intercooler can be arranged upstream of the extraction point and an air turbine can be arranged downstream of the extraction point in the combustion chamber charge-air line.

Also, a first intercooler can be arranged upstream of the extraction point and an air turbine-compressor unit can be arranged downstream of the extraction point, wherein the air turbine can be arranged downstream of the extraction point in the combustion chamber charge-air line and the compressor can be arranged downstream of the extraction point in the branching-off prechamber flushing line.

The internal combustion engine is preferably characterized in that a check valve or a check valve and a buffer tank is/are arranged downstream of the extraction point in the prechamber flushing line.

In an example of the invention, a second intercooler can be arranged downstream of the extraction point in the prechamber flushing line.

In a further development of the invention, it is provided that the internal combustion engine in the prechamber flushing line, a feed point of a fuel supply line is arranged for the supply of fuel to the flushing fluid, wherein in the prechamber flushing line at the feed point of the fuel supply, either fresh air or a fresh air/exhaust air mixture is present to which fuel can be supplied.

A method for operating an internal combustion engine is also provided, wherein the internal combustion engine comprises at least one cylinder, wherein the at least one cylinder comprises a main combustion chamber for burning a fuel/air mixture or a fuel/air/exhaust gas mixture and a flushed prechamber which is connected to the main combustion chamber via at least one overflow duct on the fluid side, and which includes at least one exhaust gas turbocharger, which has a turbine for the expansion of the exhaust gas leaving the at least one cylinder and a compressor for compressing the fresh air or a fresh air/exhaust gas mixture to be supplied by the at least one compressor as compressed charge-air, wherein it is provided according to the invention that a combustion chamber charge-air line is formed in a charge-air line downstream of the compressor for the supply of the combustion chamber, and a prechamber flushing line branching off at an extraction point is formed for the supply of the prechamber, so that the combustion chamber can be fed a cooled first partial charge-air amount and the prechamber can be fed a cooled second partial charge-air amount as flushing fluid with an optional admixture of fuel.

According to the method, it is preferably provided in all embodiments that the cooled first partial amount of charge-air is expanded in an air turbine for the supply of the combustion chamber.

According to the method, it is also preferably provided that the cooled second partial charge-air amount for the supply of the prechamber with flushing fluid, to which fuel is optionally added, is previously recompressed in the further compressor.

In an example of the method, the compressor of the exhaust gas turbocharger is supplied with fresh air from an upstream fresh air line so that fresh air is supplied to the combustion chamber charge-air line for the supply of the combustion chamber and is supplied to the prechamber flushing line for flushing the prechamber.

In an example of the method step, the compressor of the exhaust gas turbocharger is supplied with a fresh air/exhaust gas mixture from a fresh air line arranged upstream, since the fresh air line is connected upstream of the compressor to an exhaust gas recirculation line of an exhaust gas line, so that a fresh air/exhaust gas mixture is supplied to the combustion chamber charge-air line for the supply of the combustion chamber and is supplied to the prechamber flushing line for flushing the prechamber.

The method is further characterized in that the compressed charge air, in particular the fresh air or the fresh air/exhaust gas mixture in the prechamber flushing line downstream of the extraction point, is optionally supplied with fuel as required, so that the at least one prechamber is flushed with a fuel/fresh air mixture or a fuel/air/exhaust gas mixture as flushing fluid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The present invention relates to an Otto-cycle internal combustion engine 1, in particular a gasoline engine operated with a fuel K, in particular with a gas or a liquid gasoline, and a method for operating such a gasoline engine.

Figure 1:
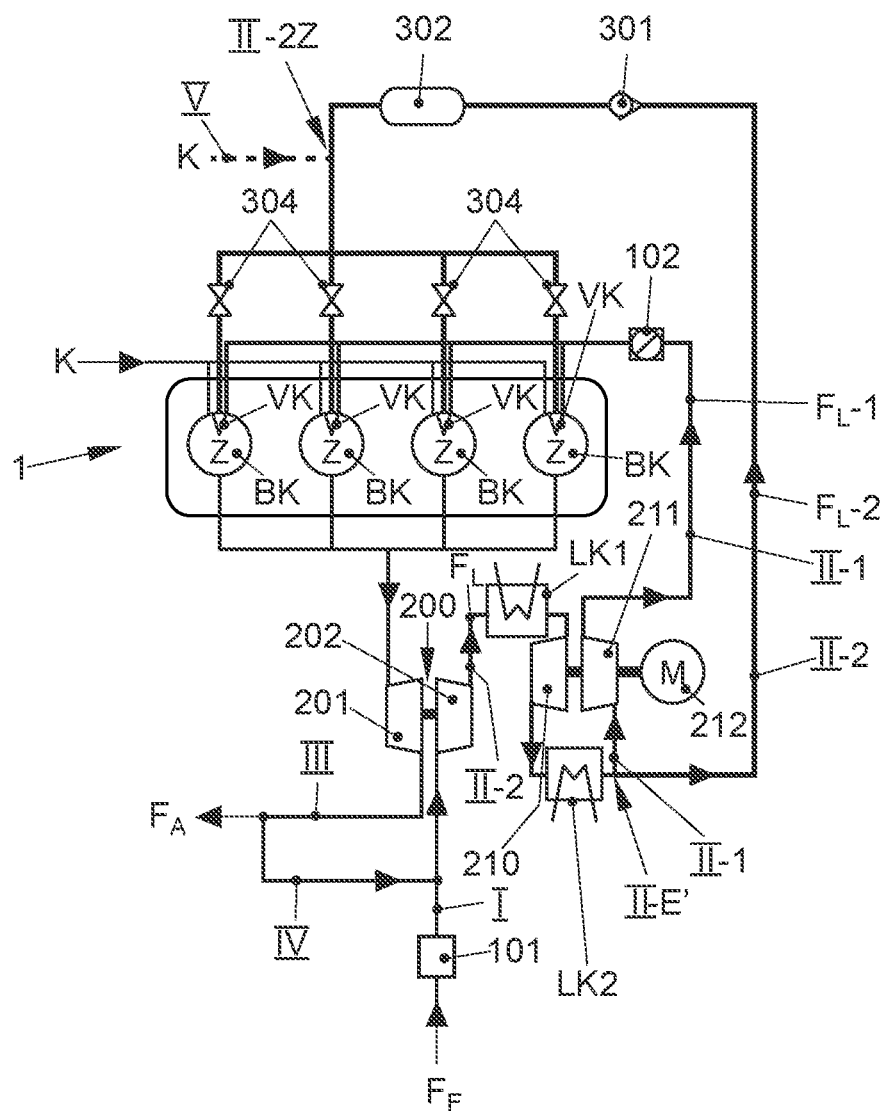
FIG. 1 is a schematic representation of a turbocharged gasoline engine according to the invention with a supply of an active prechamber with charge-air extraction downstream of an exhaust gas turbocharger in combination with turbo cooling.
Figure 2:
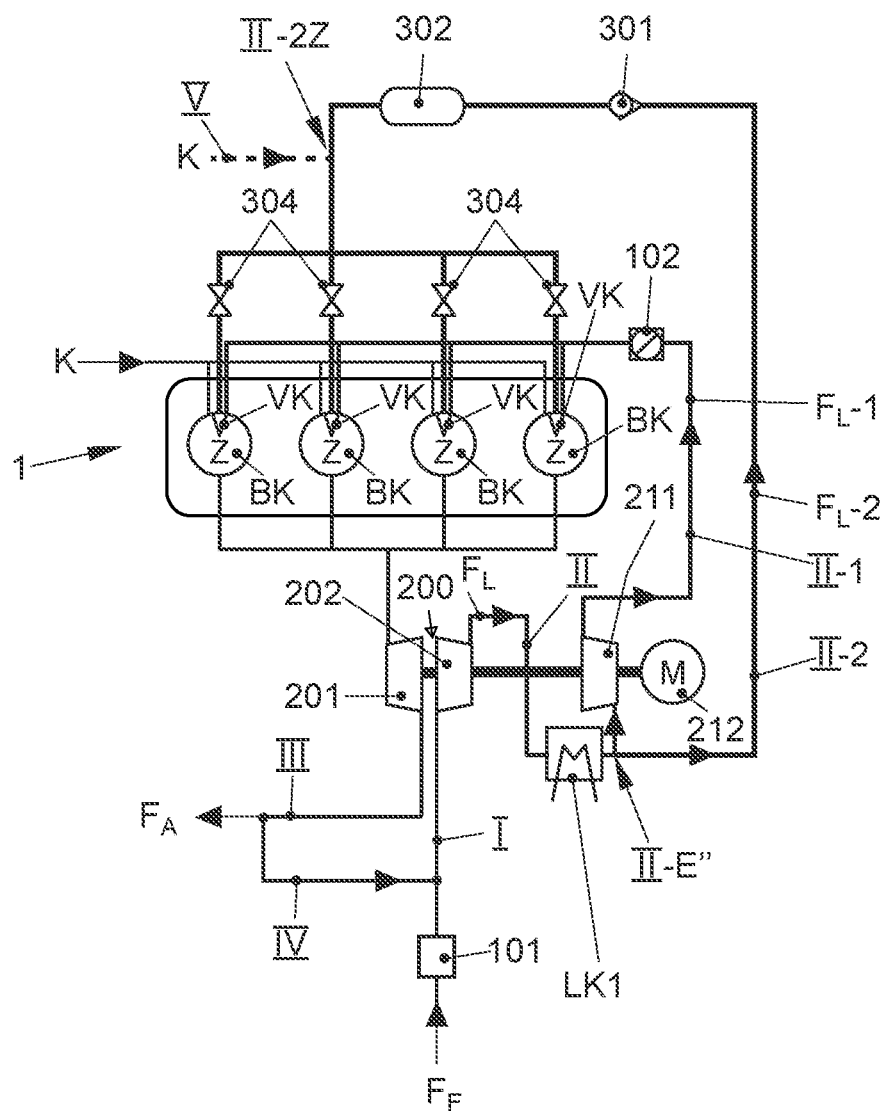
FIG. 2 is a schematic representation of a turbocharged gasoline engine according to the invention with a supply of an active prechamber with charge-air extraction downstream of an exhaust gas turbocharger in combination with turbo cooling.
Figure 3:
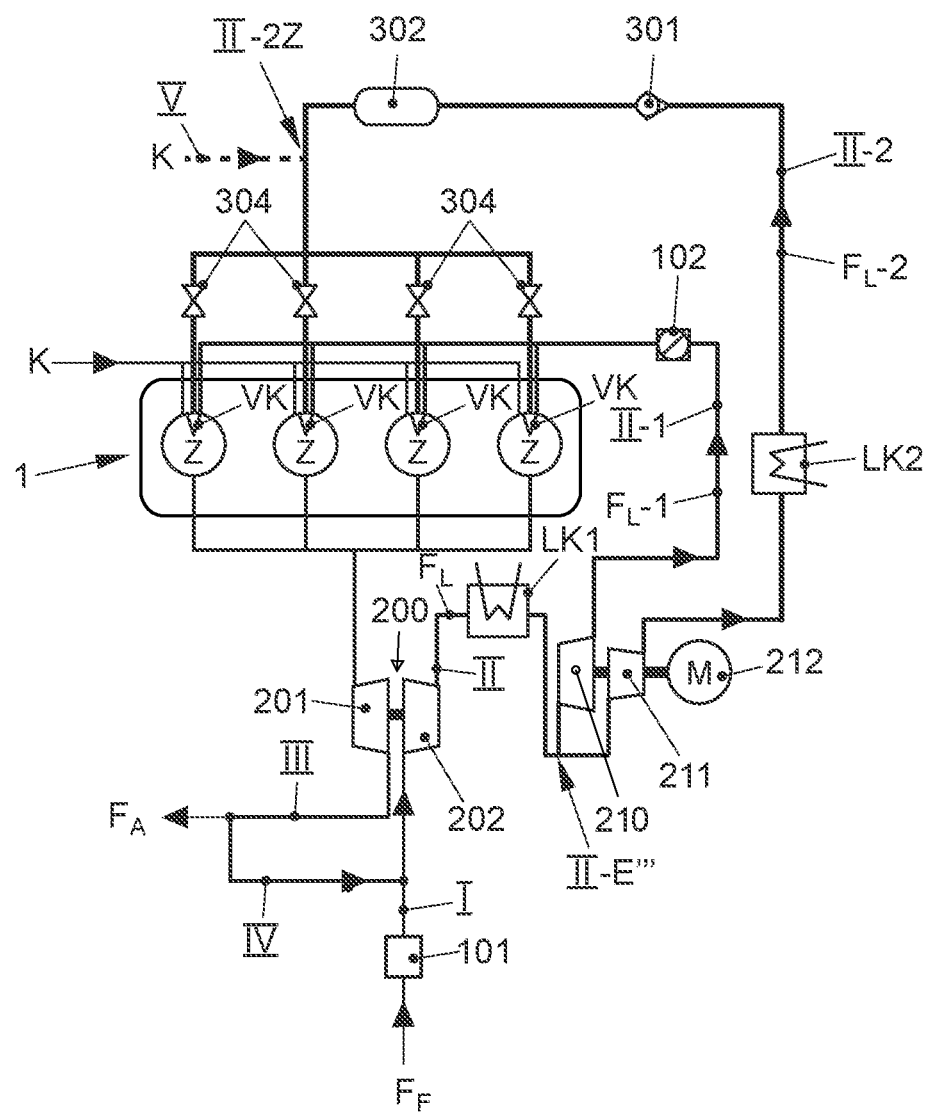
FIG. 3 is a schematic representation of a turbocharged gasoline engine according to the invention with a supply of an active prechamber with charge-air extraction downstream of an exhaust gas turbocharger in combination with turbo cooling.

FIGS. 1 to 3 each show a diagram of the gasoline engine 1 according to the invention, which comprises several cylinders Z. Each of the cylinders Z has a main combustion chamber BK and a prechamber VK, wherein the respective prechamber VK is coupled to the main combustion chamber BK of the respective cylinder Z via at least one overflow duct.

In the cylinders Z of the gasoline engine 1, namely in the area of the main combustion chambers BK of the cylinders Z, a mixture of fuel K and air $F_F$ or a fuel/fresh air/exhaust gas mixture $K/F_F/F_A$ is burned, wherein the resulting exhaust gas $F_A$ is vented via an exhaust gas turbocharger 200, in particular via a turbine 201 of the exhaust gas turbocharger 200, and, in the exemplary embodiment, vented in an exhaust gas line III via catalytic converters, in particular via a precatalytic converter and a main catalytic converter.

Energy obtained in this way in the region of the turbine 201 of the turbocharger 200 is used for compressing combustion air, in particular fresh air $F_F$ or a fresh air/exhaust gas mixture $F_F/F_A$ in a compressor 202, which is then supplied to the combustion chambers BK of the gasoline engine 1 and the prechambers VK of the gasoline engine 1 in charge-air lines II-1, II-2 as compressed charge-air $F_L$.

The exemplary embodiments in FIGS. 1 to 3 relate to a gasoline engine 1 with a spark-ignited internal mixture formation, that is, fuel K, liquid fuel by direct injection or gaseous fuel by injection via injectors/injection valves, is added to the fresh air $F_F$ or the fresh air/exhaust gas mixture $F_F/F_A$ in the main combustion chamber BK and is ignited by means of an ignition device.

The described method may also be used analogously in an external mixture formation. This means, the illustration and the subsequent description are provided based on one of several embodiment variants of the mixture formation.

In the exemplary embodiment, an exhaust gas recirculation line IV is formed upstream of the turbine 201, which in the conventional manner comprises an exhaust gas recirculation cooler and an exhaust gas recirculation flap, wherein the exhaust gas recirculation line IV with the exhaust gas $F_A$ guided therein is incorporated in the fresh air line I downstream of an air filter 101 of the fresh air line I, upstream of the compressor 202.

According to the invention, the gasoline engine 1 has two partial charge-air lines II-1 and II-2, via which charge-air $F_L$-1 and $F_L$-2 is supplied to the main combustion chambers BK and the prechambers VK, see FIG. 1, which are formed downstream of the compressor 202, starting from the common charge-air line II, which will be further discussed below.

Starting from the common charge-air line II, the first partial charge-air line II-1 supplies compressed charge-air $F_L$-1 from the compressor 202 to the main combustion chambers BK of the respective cylinders Z.

Starting from the common charge-air line II, the second partial charge-air line II-2 provides compressed charge-air $F_L$-2 from the compressor 202 to the prechambers of the respective cylinders Z.

In other words, the charge-air line II has an extraction point II-E (upstream of the throttle valve 102), at which compressed charge-air $F_L$ is extracted as flushing fluid for the prechambers VK of the respective cylinders Z with the boost pressure present upstream of the throttle valve 102, which is why the second partial charge-air line II-2 forms the prechamber flushing line for the prechambers VK and the first partial charge-air line II-1 for the main combustion chambers BK.

Charge-air $F_L$ is considered to be fresh air $F_F$ or a fresh air/exhaust gas mixture $F_F/F_A$.

Flushing fluid is considered to be fresh air $F_F$ or a fresh air/exhaust gas mixture $F_F/F_A$ or, when fuel K is supplied, a fuel/fresh air $F_F$ mixture $K/F_F$ or a fuel/fresh air/exhaust gas mixture $k/F_F/F_A$.

Downstream of the extraction point II-E, a check valve 301, preferably a buffer tank 302 and, after appropriate division of the prechamber flushing line II-2 into individual flushing fluid lines, timing valves 304 are assigned to each cylinder Z via which at predefined times a predefined amount of flushing fluid $F_L$-2 is fed to the prechambers VK of the respective cylinder Z via the prechamber flushing line II-2.

There is either fresh air $F_F$ or a fresh air/exhaust gas mixture $F_F/F_A$ or, with additional supply of fuel K, a fuel/fresh air $F_F$ mixture $K/F_F$ or a fuel/fresh air/exhaust gas mixture $K/F_F/F_A$, so that a predefined amount of flushing fluid can be supplied to the prechambers VK of the respective cylinder Z at predefined times.

According to the invention, for the flushing of the active prechambers VK with charge-air $F_L$-2, in particular with fresh air $F_F$ or also with the fresh air/exhaust gas mixture $F_F/F_A$ or the fuel/fresh air/exhaust gas mixture $K/F_F/F_A$ for the flushing fluid to be supplied, a pressure level above the boost pressure of the compressor 202 of the charge air $F_L$-1 is required in the area of the combustion chamber BK, as will be explained below with reference to the three embodiments shown in FIGS. 1 to 3.

In general, according to the invention, for flushing an active prechamber VK with the flushing fluid to be supplied ($F_F$; $F_F/F_A$; $K/F_F$; $K/F_F/F_A$), a pressure level above the intake manifold pressure in the combustion chamber charge-air line II-1 upstream of the combustion chamber BK is needed.

The prechamber pressure in the prechamber VK, which is greater than the intake manifold pressure (analogous to the combustion chamber pressure), is generated according to the invention in combination with turbo cooling.

In turbo cooling, the fresh air $F_F$ or a fresh air/exhaust gas mixture $F_F/F_A$ for the gasoline engine 1 is initially compressed more highly in the exhaust gas turbocharger 201, 202 than is necessary for filling the cylinder Z of the combustion chamber BK, and then the fresh air $F_F$ or also the fresh air/exhaust gas mixture $F_F/F_A$ is cooled by at least one intercooler LK1, LK2.

Starting from this highest pressure level generated by the exhaust gas turbocharger 201, 202, the charge-air $F_L$-2, in particular the fresh air $F_F$ or also the fresh air/exhaust gas mixture $F_F/F_A$, is extracted at an extraction point (II-E', II-E'', II-E''') for the supply of the prechambers VK with compressed and cooled flushing fluid ($F_F$; $F_F/F_A$; $K/F_F$; $K/F_F/F_A$).

The charge-air $F_L$-1, the so-called cooled main air flow for the supply of the combustion chambers BK, which is not extracted at an extraction point (II-E', II-E'', II-E''') for the prechambers VK, is then expanded via an air turbine 211 downstream of the extraction point (II-E', II-E'', II-E''') in the charge-air line II-1 (see FIGS. 1 to 3), whereby the temperature and the pressure of the fresh air $F_F$ or the fresh air/exhaust gas mixture $F_F/F_A$ is further reduced as compared to the fresh air $F_F$ or the fresh air/exhaust gas mixture $F_F/F_A$ in the charge-air line II-2.

The overall structure is therefore possible and useful in combination with an external exhaust gas recirculation eAGR [external exhaust gas recirculation], as explained above and explained below, so that in each case a fresh air/exhaust gas mixture $F_F/F_A$ can be used as charge-air FL-1, FL-2 and as flushing fluid.

FIG. 1 shows a schematic representation of a turbocharged gasoline engine 1 according to the invention with a flushing fluid supply to an active prechamber VK—in a first embodiment—with charge-air extraction (fresh air $F_F$ or the fresh air/exhaust gas mixture $F_F/F_A$) downstream of an exhaust gas turbocharger 201, 202 in combination with turbo cooling LK1, LK2.

Main features of the first embodiment according to FIG. 1:

characterized by a) a gasoline engine 1 with active prechambers VK, wherein charge-air is extracted at the extraction point II-E' for the supply of the prechambers VK of the charge-air path downstream of a compressor 202 of the turbocharger 201, 202 and of a first intercooler LK1, wherein b) the charge-air line downstream of the first intercooler LK1 comprises a compressor/air turbine unit 210, 211, wherein a second intercooler LK2 is arranged between the compressor 210 and the air turbine 211, and wherein the charge-air extraction $F_L$-2 (of the fresh air $F_F$ or the fresh air/exhaust gas mixture $F_F/F_A$) for the prechambers VK between the second intercooler LK2 and the air turbine 211 takes place at the extraction point II-E', and c) the supply of fuel K into the charge-air $F_L$-2, so that after the supply of fuel, a fuel/fresh air $F_F$ mixture $K/F_F$ or a fuel/fresh air/exhaust gas mixture $K/F_F/F_A$ is formed from the fresh air $F_F$ or the fresh air/exhaust gas mixture $F_F/F_A$ as flushing fluid for flushing the prechambers VK.

FIG. 2 shows a schematic representation of a turbocharged gasoline engine 1 according to the invention with a flushing fluid supply to an active prechamber VK—in a second embodiment—with a charge-air extraction fresh air $F_F$ or of the fresh air/exhaust gas mixture $F_F/F_A$) downstream of an exhaust gas turbocharger 201, 202 in combination with turbo cooling LK1.

Main features of the second embodiment according to FIG. 2:

characterized by a) a gasoline engine 1 with active prechambers VK, wherein the charge-air for the supply of the prechambers VK of the charge-air path is extracted at the extraction point II-E'' downstream of a compressor 202 of the turbocharger 201, 202 and of the first intercooler LK1, wherein b) the charge-air line downstream of the first intercooler LK comprises an air turbine 211, wherein the air turbine 211 and the turbocharger 201, 202 lie on a common shaft, wherein the charge-air extraction (fresh air $F_F$ or the fresh air/exhaust gas mixture $F_F/F_A$) for the prechambers VK takes place between the first intercooler LK1 and the air turbine 211, and c) the supply of fuel K into the charge-air $F_L$-2, so that after the fuel supply, a fuel/fresh air $F_F$ mixture $K/F_F$ or a fuel/fresh air/exhaust gas mixture $K/F_F/F_A$ is formed from the fresh air $F_F$ or the fresh air/exhaust gas mixture $F_F/F_A$ as flushing fluid for flushing the prechamber VK.

FIG. 3 shows a schematic representation of a turbocharged gasoline engine 1 according to the invention with a flushing fluid supply to an active prechamber VK—in a third embodiment—with charge-air extraction fresh air $F_F$ or the fresh air/exhaust gas mixture $F_F/F_A$) downstream of an exhaust gas turbocharger 201, 202 in combination with turbo cooling LK1.

Main features of the third embodiment according to FIG. 3:

characterized by a) a gasoline engine 1 with active prechambers VK, wherein the charge-air for the supply of the prechambers VK of the charge-air path is extracted at the extraction point II-E''' downstream of a compressor 202 of the turbocharger 201, 202 and of the first intercooler LK1, wherein b) the charge-air line downstream of the first intercooler LK comprises a compressor/air turbine unit 210, 211, wherein the compressor/air turbine unit 210, 211 and the turbocharger 201, 202 do not lie on a common shaft, wherein the charge-air extraction (fresh air $F_F$ or of the fresh air/exhaust gas mixture $F_F/F_A$) for the prechambers VK downstream of the compressor 202 of the exhaust gas turbocharger 201, 202 and of the first intercooler LK1 takes place at the extraction point II-E''', that predefined x masses %, in particular approximately 97% of the charge-air mass $F_L$-1 for the combustion chambers BK in the air turbine 211 of the compressor/air turbine unit 210, 211 are expanded, and predefined x masses %, in particular approximately 3% of the charge-air mass $F_L$-2 (flushing fluid mass) in the compressor 211 of the compressor/air turbine unit 210, 211 are recompressed for the supply of the prechambers VK.

c) The supply of fuel K into the charge-air $F_L$-2, so that after the fuel supply a fuel/fresh air $F_F$ mixture $K/F_F$ or a fuel/fresh air/exhaust gas mixture $K/F_F/F_A$ is formed from the fresh air $F_F$ or the fresh air/exhaust gas mixture $F_F/F_A$ as flushing fluid for flushing the prechamber VK.

Summarizing the embodiments according to FIGS. 1 to 3, it is provided that when flushing an active prechamber VK with flushing fluid ($F_F$; $F_F/F_A$; $K/F_F$; $K/F_F/F_A$), a pressure level above the intake manifold pressure is required. Proposed is a pressure level up to approximately twice the intake manifold pressure.

According to the invention, the pressure is generated by at least one compressor 202, 210 in combination with turbo cooling.

In turbo cooling, fresh air $F_F$ or a fresh air/exhaust gas mixture $F_F/F_A$ for the combustion chamber BK of the gasoline engine is first compressed more than is necessary to fill the cylinders Z and then cooled by at least one intercooler LK1 or two intercoolers LK2.

Starting from this pressure level downstream of the at least one intercooler LK1 or the two intercoolers LK2, representing the highest pressure in the charge-air line, the flushing fluid is extracted for the prechamber VK.

The main air flow to the combustion chamber BK (first partial charge-air flow II-1) of fresh air $F_F$ or fresh air/exhaust gas mixture $F_F/F_A$ is then expanded via an air turbine 211, whereby besides the pressure drop, the temperature of the charge-air $F_L$-1 is again reduced, ultimately resulting in the highest pressure in the charge-air path, from which the flushing fluid for the prechamber VK is extracted, being higher than that of the main air flow in the intake manifold or in the combustion chambers BK.

The overall structure is possible with an external exhaust gas recirculation eAGR, since the prechamber ignition in the prechambers VK is particularly suitable for igniting diluted charges. This embodiment is particularly suitable for lean-mixture operated engines (with excess air).

Possible embodiments are explained using the figures. It is preferably provided that an electric machine 212 is arranged on the air turbine-compressor unit 202, 211, 212 (FIG. 1) or 202, 211, 212 (FIG. 2) or 211, 201, 212 on a common shaft.

In all embodiments, the electric machine 212 can optionally be used as an e-booster, primarily transiently or also stationary over shorter periods of time. In operating points with excess torque, the electric machine 212 can preferably also be used as a generator.

The first embodiment relates to the turbo cooling of the charge air $F_L$ with two separate turbine-compressor units 201, 202 and 211, 212, 213, see FIG. 1, with double compression of the charge-air $F_L$ and double turbo cooling of the charge-air $F_L$ upstream of the extraction point II-E'.

The second embodiment relates to the turbo cooling of the charge air $F_L$ with all machines 201, 202, 211, 212 on one shaft, see FIG. 2, with simple charge-air $F_L$ upstream of the extraction point II-E''. In this embodiment, the compressor 202 of the exhaust gas turbocharger 201, 202 must generate the highest boost pressure as compared to the other two (first and third embodiment), since there is no recompression by the compressor 210 of an additional turbine compressor unit 211, 210.

The third embodiment relates to the turbo cooling of the charge-air $F_L$ with two separate turbine-compressor units 201, 202 and 211, 212, 213, see FIG. 1, with double compression of the charge-air $F_L$ and single turbo cooling of the charge-air $F_L$ upstream of the extraction point II-E'''. In the third embodiment, the exhaust gas turbocharger compressor 202 compresses the entire charge-air mass flow only slightly higher than necessary. The main mass flow (approx. 97%) is expanded via the air turbine 211 and only approx. 3% of the flushing fluid mass flow is compressed to the higher predefined pressure level via the second compressor 211. Because of the mass flow ratio of approximately 97% via the air turbine 211 and approximately 3% via the second compressor stage 210 in the prechamber flushing line II-2, the turbo cooling effect is less in this embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An internal combustion engine comprising:
   at least one cylinder having a main combustion chamber for the combustion of a fuel/air mixture or a fuel/air/exhaust gas mixture and a flushed prechamber connected with the main combustion chamber on a fluid side via at least one overflow duct;
   at least one exhaust gas turbocharger comprising a turbine for the expansion of the exhaust gas leaving the at least one cylinder and a compressor for compressing the fresh air or a fresh air/exhaust gas mixture to be supplied by at least one cylinder as compressed charge-air;
   a charge-air line downstream of the compressor, the charge-air line having an extraction point at which:

a combustion chamber charge-air line branches off to supply the combustion chamber through an air turbine; and
a prechamber flushing line branches off to supply of the prechamber,
wherein downstream of the compressor of the exhaust gas turbocharger, upstream of the extraction point, at least one intercooler for cooling the charge-air is arranged in the charge-air line.

2. The internal combustion engine according to claim 1, wherein a check valve or a check valve and a buffer tank is/are arranged in the prechamber flushing line downstream of the extraction point.

3. An internal combustion engine comprising:
at least one cylinder having a main combustion chamber for the combustion of a fuel/air mixture or a fuel/air/exhaust gas mixture and a flushed prechamber connected with the main combustion chamber on a fluid side via at least one overflow duct;
at least one exhaust gas turbocharger comprising a turbine for the expansion of the exhaust gas leaving the at least one cylinder and a compressor for compressing the fresh air or a fresh air/exhaust gas mixture to be supplied by at least one cylinder as compressed charge-air;
a combustion chamber charge-air line formed in a charge-air line downstream of the compressor, the combustion chamber charge-air line suppling the combustion chamber; and
a prechamber flushing line branching off at an extraction point is formed for the supply of the prechamber,
wherein downstream of the compressor of the exhaust gas turbocharger, upstream of the extraction point, at least one intercooler for cooling the charge-air is arranged in the charge-air line, and
wherein a first intercooler is arranged upstream of the extraction point and an air turbine is arranged downstream of the extraction point in the combustion chamber charge-air line.

4. The internal combustion engine according to claim 1, wherein a feed point of a fuel supply line for the supply of fuel to the flushing fluid is arranged in the prechamber flushing line, wherein fresh air or a fresh air/exhaust gas mixture is present at the feed point of the fuel supply line in the prechamber flushing line.

5. The internal combustion engine according to claim 1, further comprising a check valve and a timing valve assigned to the at least one cylinder.

6. The internal combustion engine according to claim 1, further comprising an exhaust gas recirculation line.

7. The internal combustion engine according to claim 6, wherein the exhaust gas recirculation line is formed upstream of the turbine.

8. A method for operating an internal combustion engine, the method comprising:
providing at least one cylinder, the at least one cylinder having a main combustion chamber for burning a fuel/air mixture or a fuel/air/exhaust gas mixture and has a flushed prechamber connected to the main combustion chamber on a fluid side via at least one overflow duct;
providing at least one exhaust gas turbocharger with a turbine for the expansion of the exhaust gas leaving the at least one cylinder;
providing a compressor for compressing fresh air or a fresh air/exhaust gas mixture to be supplied to the at least one cylinder as compressed charge-air;
forming a combustion chamber charge-air line for the supply of the combustion chamber through an air turbine, the combustion chamber charge-air line being formed in a charge-air line downstream of the compressor; and
forming a branching-off prechamber flushing line for the supply of the prechamber, the branching-off prechamber flushing line being formed at an extraction point such that the combustion chamber is supplied a cooled first partial amount of charge-air and the prechamber is supplied a cooled second partial amount of charge-air.

9. The method according to claim 8, wherein the cooled first partial amount of charge-air is expanded in an air turbine for the supply of the combustion chamber.

10. The method according to claim 8, wherein the cooled second partial amount of charge-air is recompressed in a further compressor for the supply of the prechamber.

11. The method according to claim 10, wherein the compressor is supplied with a fresh air/exhaust gas mixture from an upstream fresh air line, since the fresh air line is connected to an exhaust gas recirculation line of an exhaust gas line so that a fresh air/exhaust gas mixture is supplied to the combustion chamber charge-air line for the supply of the combustion chamber and is supplied to the prechamber flushing line for flushing the prechamber.

12. The method according to claim 10, wherein the compressor of the exhaust gas turbocharger is supplied with fresh air from an upstream fresh air line so that the combustion chamber charge-air line for the supply of the combustion chamber and the prechamber flushing line for flushing the prechamber are supplied with fresh air.

13. The method according to claim 12, wherein fuel is supplied as required to the compressed charge-air, in particular to the fresh air or the fresh air/exhaust gas mixture, in the prechamber flushing line (downstream of the extraction point so that the at least one prechamber is flushed with a fuel/fresh air mixture or a fuel/air/exhaust gas mixture.

14. An internal combustion engine comprising:
at least one cylinder having a main combustion chamber for the combustion of a fuel/air mixture or a fuel/air/exhaust gas mixture and a flushed prechamber connected with the main combustion chamber on a fluid side via at least one overflow duct;
at least one exhaust gas turbocharger comprising a turbine for the expansion of the exhaust gas leaving the at least one cylinder and a compressor for compressing the fresh air or a fresh air/exhaust gas mixture to be supplied by at least one cylinder as compressed charge-air;
a combustion chamber charge-air line formed in a charge-air line downstream of the compressor, the combustion chamber charge-air line suppling the combustion chamber; and
a prechamber flushing line branching off at an extraction point is formed for the supply of the prechamber,
wherein downstream of the compressor of the exhaust gas turbocharger, upstream of the extraction point, at least one intercooler for cooling the charge-air is arranged in the charge-air line, and
wherein a first intercooler and a further compressor of an air turbine-compressor unit and a further intercooler are arranged upstream of the extraction point, wherein the air turbine is arranged downstream of the extraction point in the combustion chamber charge-air line.

15. The internal combustion engine according to claim 3, wherein a second intercooler is arranged downstream of the extraction point in the prechamber flushing line.

16. An internal combustion engine comprising:
- at least one cylinder having a main combustion chamber for the combustion of a fuel/air mixture or a fuel/air/exhaust gas mixture and a flushed prechamber connected with the main combustion chamber on a fluid side via at least one overflow duct;
- at least one exhaust gas turbocharger comprising a turbine for the expansion of the exhaust gas leaving the at least one cylinder and a compressor for compressing the fresh air or a fresh air/exhaust gas mixture to be supplied by at least one cylinder as compressed charge-air;
- a combustion chamber charge-air line formed in a charge-air line downstream of the compressor, the combustion chamber charge-air line suppling the combustion chamber; and
- a prechamber flushing line branching off at an extraction point is formed for the supply of the prechamber,
- wherein downstream of the compressor of the exhaust gas turbocharger, upstream of the extraction point, at least one intercooler for cooling the charge-air is arranged in the charge-air line, and
- wherein a first intercooler is arranged upstream of the extraction point and an air turbine-compressor unit is arranged downstream of the extraction point, wherein the air turbine is arranged downstream of the extraction point in the combustion chamber charge-air line and the compressor is arranged downstream of the extraction point in the branching-off prechamber flushing line.

* * * * *